United States Patent
Rintoo

(10) Patent No.: US 9,261,180 B2
(45) Date of Patent: Feb. 16, 2016

(54) POWER SPLIT TRANSMISSION

(75) Inventor: Mikko Rintoo, Palokka (FI)

(73) Assignee: Valtra Oy Ab, Soulahti (FI)

( * ) Notice: Subject to any disclaimer, the term of this patent is extended or adjusted under 35 U.S.C. 154(b) by 0 days.

(21) Appl. No.: 14/125,789

(22) PCT Filed: Jun. 1, 2012

(86) PCT No.: PCT/EP2012/060385
§ 371 (c)(1),
(2), (4) Date: Nov. 7, 2014

(87) PCT Pub. No.: WO2012/171811
PCT Pub. Date: Dec. 20, 2012

(65) Prior Publication Data
US 2015/0072823 A1    Mar. 12, 2015

(30) Foreign Application Priority Data
Jun. 14, 2011  (GB) .................................. 1109963.7

(51) Int. Cl.
| | |
|---|---|
| *F16H 47/04* | (2006.01) |
| *F16H 37/06* | (2006.01) |
| *F16H 3/72* | (2006.01) |
| *F16H 61/04* | (2006.01) |
| *F16H 37/08* | (2006.01) |

(52) U.S. Cl.
CPC ............... *F16H 37/06* (2013.01); *F16H 3/728* (2013.01); *F16H 47/04* (2013.01); *F16H 61/0403* (2013.01); *F16H 2037/0886* (2013.01)

(58) Field of Classification Search
CPC ......... F16H 37/06; F16H 47/04; F16H 3/728; F16H 61/0403
See application file for complete search history.

(56) References Cited

U.S. PATENT DOCUMENTS

| 2007/0113693 | A1 | 5/2007 | Chen | |
| 2010/0184551 | A1* | 7/2010 | Hiraoka et al. | 475/80 |
| 2011/0015022 | A1 | 1/2011 | Stoeckl et al. | |

FOREIGN PATENT DOCUMENTS

| DE | 3815780 A1 | 12/1988 |
| JP | 2003301897 A | 10/2003 |
| WO | WO-2008/142524 A2 | 11/2008 |

OTHER PUBLICATIONS

International Search Report for International Application No. PCT/EP2012/060385 dated Aug. 2, 2012.
GB Search Report for GB Application No. 1109963.7 dated Oct. 12, 2011.

* cited by examiner

*Primary Examiner* — Derek D Knight

(57) ABSTRACT

A power-split transmission for a vehicle comprises a forward-reverse transmission module, an epicyclic module and a secondary power branch. The forward-reverse power shuttle module (12) comprises an input shaft (22) coupled to a primary motor (20) and an output shaft (38). Also included, first and second clutches (30,48) are alternatively engageable to close respective forward and reverse drive paths between the input shaft and output shaft. Engagement of the first clutch couples the input shaft directly to the output shaft. Engagement of the second clutch couples the input shaft to the output shaft via first and second gear sets (32, 34, 36, 42, 44) which each comprise a plurality of meshed gears. One of the gear sets (32, 34, 36) comprises an odd number of gears and the other gear set (42, 44) comprises an even number of gears. The epicyclic module comprises a first epicyclic input connected to the output shaft of the forward-reverse transmission module, a second epicyclic input connected to an output side of the secondary power branch, and an epicyclic output. The secondary power branch derives power from the primary motor via the first gear set.

7 Claims, 4 Drawing Sheets

| Torque Transfer Path | | | | | | | | | |
|---|---|---|---|---|---|---|---|---|---|
| Stage | F | R | C1 | C2 | C3 | S1 | S2 | S3 | S4 |
| R5 |  | X |  | X |  |  |  | X |  |
| R4 |  | X |  |  | X |  | X |  |  |
| R3 |  | X |  | X |  |  |  |  | X |
| R2 |  | X |  |  | X | X |  |  |  |
| R1 |  | (X) | X |  |  | X |  |  |  |
| 0 |  |  | X |  |  | X |  |  |  |
| 1 | (X) |  | X |  |  | X |  |  |  |
| 2 | X |  |  |  | X | X |  |  |  |
| 3 | X |  |  | X |  |  |  |  | X |
| 4 | X |  |  |  | X |  | X |  |  |
| 5 | X |  |  | X |  |  |  | X |  |

Fig. 3

1
POWER SPLIT TRANSMISSION

BACKGROUND OF THE INVENTION

1. Field of Invention

The invention relates to a power-split transmission having a forward-reverse transmission module, an epicyclic module and a secondary power branch for application within a vehicle transmission and which forward-reverse transmission module serves to selectively reverse the direction of torque transfer between an input shaft and an output shaft.

2. Description of Related Art

Vehicle transmissions typically include a gearing arrangement which allows the vehicle to move in reverse. In automobiles, the reverse gear is traditionally a dedicated gear element included in a main gearbox. The same applies to older agricultural tractors. More modern tractors, however, often include a power shuttle unit (or module) which allows all forward gears in the main gearbox to be used also in reverse. International application publication WO-2008/142524 discloses a transmission for an agricultural tractor which includes an example power shuttle stage based on an epicyclic arrangement.

OVERVIEW OF THE INVENTION

It is an object of the invention to provide a simple and efficient power shuttle transmission module for use in an agricultural tractor transmission.

Thus, in accordance with the invention there is provided a power-split transmission for a vehicle comprising a forward-reverse transmission module, an epicyclic module and a secondary power branch, the forward-reverse transmission module comprising an input shaft coupled to a primary motor, an output shaft, first and second clutches which are alternatively engageable to close respective forward and reverse drive paths between the input shaft and output shaft, wherein engagement of the first clutch couples the input shaft directly to the output shaft, and engagement of the second clutch couples the input shaft to the output shaft via first and second gear sets which each comprise a plurality of meshed gears, one of said gear sets comprising an odd number of gears and the other said gear set comprising an even number of gears, the epicyclic module having a first epicyclic input connected to the output shaft of the forward-reverse transmission module, a second epicyclic input connected to an output side of the secondary power branch, and an epicyclic output, wherein the secondary power branch derives power from the primary motor via the first gear set.

Advantageously, the direct connection between input and output shaft in forward gear maximises the efficiency of torque transfer. This represents a significant improvement over epicyclic-based shuttle modules. Furthermore, the simple construction of the gear trains required to provide reverse gear reduces complexity and thus cost in construction.

In a preferred arrangement the first gear set consists of three meshed gears, and the second gear set consists of two meshed gears.

In a preferred embodiment of this setup, the forward-reverse module further comprises an auxiliary shaft, wherein the first gear set is in driving connection between the input shaft and the auxiliary shaft, and the second gear set is in driving connection between the auxiliary shaft and an input side of the second clutch.

In this arrangement, the reverse torque path in the power shuttle module makes use of the first gear set which is already present in the power split (or power branched) transmission. Therefore, the existing transmission can be simply modified with the addition of two clutches and a further gear train to provide the power shuttle functionality.

Furthermore, the locating of the power shuttle module in accordance with the invention upstream of the power split transmission facilitates a drive to the secondary power branch which is constant in direction. This allows a more basic bearing support to be used for the input to the secondary power branch. Furthermore, the power shuttle module reverses the input drive to the epicyclic whilst keeping the input drive direction to the secondary power branch constant.

The secondary power branch may comprise a hydrostatic drive connection which includes a hydraulic pump and a hydraulic motor as in that disclosed by WO-2008/142524. Alternatively, the secondary power branch may comprise an electrical drive connection which includes an electrical generator and an electric motor.

Alternatively further still, the secondary power branch may comprises a mechanical drive connection between the primary motor and the output side thereof and may, for example, include one or more clutches.

Although delivering particular benefits when located upstream of the power split transmission, the power shuttle of the present invention may alternatively be located downstream thereof.

In a preferred embodiment the transmission serves to transfer torque from a primary motor to a differential gear, wherein the epicyclic module comprises a first output and a second output, the transmission further comprising a direct shift transmission module, and first, second and third main torque transfer paths between the primary motor and differential gear, each main torque transfer path including a clutch and a synchromesh unit which allows selection of one of a plurality of torque transfer sub-paths within the direct shift transmission module, the first main torque transfer path bypassing the epicyclic module and including the secondary power branch, the first and second epicyclic outputs being alternatively coupled to the differential gear via the second and third torque transfer paths respectively, wherein the first and third main torque transfer paths share a synchromesh unit.

When the secondary power branch is a hydrostatic continuously variable drive connection comprising a variable displacement pump and fixed displacement motor, a fully hydrostatic transmission stage may be provided wherein the (first) main torque transfer path bypasses the epicyclic module and both clutches of the power shuttle module. In this case, the ratio is varied by adjusting the angle of the pump swashplate, for example, between a maximum positive angle (forward) and a maximum negative angle (reverse). The act of shifting transmission stage from fully hydrostatic to power split (that is to one of the second and third main torque transfer paths) requires one of the two power shuttle clutches to close depending on the drive direction and thus engagement of the epicyclic module. Advantageously, the positioning of the power shuttle module upstream of the power split module maintains a constant drive direction for the secondary power branch whilst reversing the drive to the epicyclic input. This delivers smooth engagement of the power split transmission stage from the hydrostatic mode regardless of the driving direction.

BRIEF DESCRIPTION OF THE DRAWINGS

Further advantages of the invention will become apparent from reading the following description of specific embodiments with the reference to the appended drawings in which:

FIG. 3 shows a tabular summary of the torque transfer paths for each transmission stage.

The present invention is susceptible of embodiments of many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
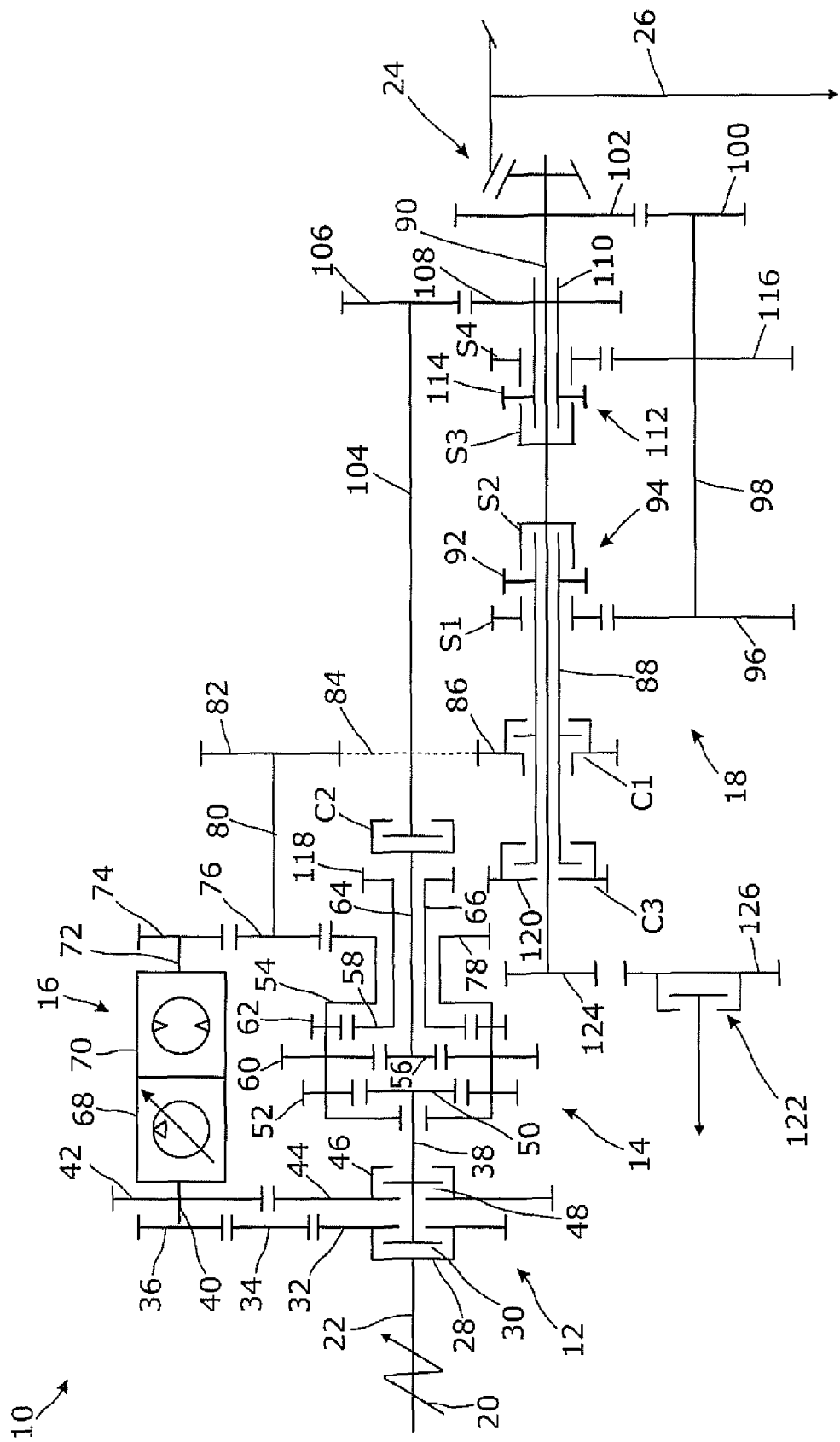
FIG. 1 shows diagrammatically the layout of a vehicle transmission in accordance with an embodiment of the invention.

With reference to FIG. 1, an agricultural tractor transmission 10 is shown diagrammatically. The transmission 10 includes a forward-reverse transmission module 12, and epicyclic module 14, a hydrostatic drive branch 16 and a direct shift transmission (DSG) module 18. The inter-relationship between these components will be described in the following passages. At its input end, transmission 10 is coupled to an internal combustion engine 20 which generates torque via a driveshaft 22 which is transferred via transmission 10 to a differential gearing 24. The invention is not limited to vehicles with internal combustion engines and other sources of torque such as electric motors may instead be employed. The differential gear 24 serves to distribute the transmitted torque to a rear axle of the agricultural tractor represented at 26.

Driveshaft 22 is integral with an input shaft of the forward-reverse transmission module 12 and is also integral with an input side 28 of forward clutch 30 and first gear 32 in a first gear set 32, 34, 36 to be described in more detail below. Forward clutch 30 is closed to render driveshaft 22 integral with shaft 38 which forms a first epicyclic input.

Third gear 36 of the first gear set 32, 34, 36 is keyed to a shaft 40 which provides an input side to hydrostatic power branch 16 to be described below. A further gear 42 is keyed to shaft 40 and provides a first gear in a second gear set 42, 44. Gear 44 idles on shaft 40 and is integral with an input side 46 of reverse clutch 48. Closure of reverse clutch 48 completes a mechanical drive connection between driveshaft 22 and epicyclic first input 38 via the first gear train 32, 34, 36 and second gear train 42, 44.

Turning to the epicyclic module 14, first sun gear 50 is keyed to shaft 38 and drives a first set of planetary gears 52 supported by planet carrier 54. Second and third sun gears 56, 58 are each driven by respective planetary gear sets 60, 62 which are coupled to the same planet carrier 54. Second and third sun gears 56, 58 are integral with first and second epicyclic output shafts 64, 66 which are mutually co-axial.

The epicyclic module 14 in this example does not include a ring gear. However, it is envisaged that alternative epicyclic arrangements known in the art may be used instead without deviating from the invention.

Turning to the hydrostatic power branch 16, a variable displacement pump 68 is connected hydraulically to a fixed displacement pump 70 in a known manner. The pump 68 is driven by shaft 40 whilst the motor 70 drives output shaft 72 with integral gear 74 which itself is meshed with gear 76 which, in turn, is meshed with gear 78 being integral with planet carrier 54 which serves as a second epicyclic input. The variable displacement pump 68 may take may forms but is typically provided by an axial piston pump with a variable angle swashplate as in known continuously variable transmissions. The non-mechanical drive connection between pump 68 and motor 70 allows a continuous range of input to output speed ratios between input shaft 40 and output shaft 72 including a zero ratio in which the output speed is zero. The hydrostatic power branch 16 described is similar to that currently available on agricultural tractors branded VALTRA (registered trade mark) including a continuously variable transmission (CVT).

Figure 4:
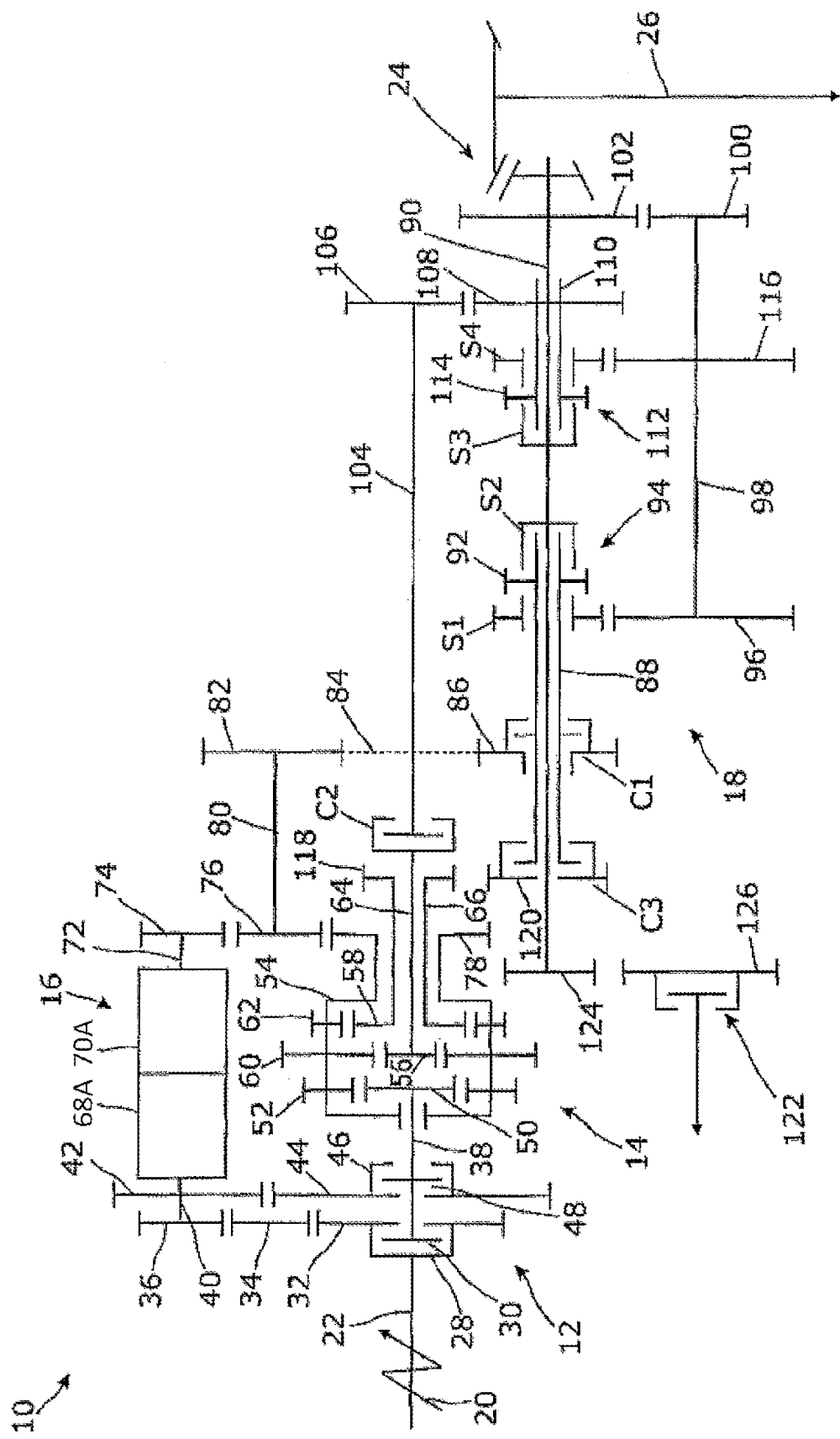
FIG. 4 shows an alternate embodiment of the vehicle transmission.

Although a hydrostatic drive connection is provided between shafts 40 and 72 it should be understood that other non-mechanical drive connections may be used instead such as those including an electric generator 68A and an electric motor 70A for example as illustrated in FIG. 4.

Together, the forward reverse transmission module 12, epicyclic module 14 and hydrostatic power branch 16 provide a, potentially standalone, CVT module having two output shafts 64, 66.

In the example shown in FIG. 1, a third output is taken from gear 76 in the gear train 74, 76 coupling the hydrostatic power branch output 72 and planet carrier 54. Third output shaft 80 is integral with gear 76. Torque transferred by third output shaft 80 bypasses epicyclic module 14 and the rotational speed is dependant solely on the engine speed and gear ratio conveyed by hydrostatic branch 16. In this example the three outputs provided by shafts 64, 66, 80 serve to power the DSG module 18. However, it should be understood that the CVT having the three outputs described could be employed in other applications.

Turning to the DSG module 18 torque is taken from one of shafts 64, 66, 80 via respective gear trains described below. In a first torque transfer path gear 82 is keyed to shaft 80 and meshed with gear 84 which is, in turn, meshed with gear 86 forming a gear train. Gear 86 idles on first synchromesh shaft 88 which itself is hollow and disposed coaxially with output shaft 90 coupled to differential gear 24. Furthermore, gear 86 is integral with an input side of first clutch C1.

Closure of clutch C1 renders gear 86 integral with first synchromesh shaft 88 which, in turn, is integral with first synchromesh gear 92 which forms part of first synchromesh unit 94.

First synchromesh unit 94 includes a coupling arrangement (not shown) which renders the driven synchromesh gear 92 with first synchromesh gear S1 or second synchromesh gear S2. Synchromesh arrangements are well known in the field of transmissions and the basic principle will not be described herein.

When first synchromesh gear S1 is engaged torque is transferred from first synchromesh shaft 88 to output shaft 90 via gears S1, 96, shaft 98 and gear train 100,102. Alternatively, when second synchromesh gear S2 is engaged torque is transferred from first synchromesh shaft 88 to output shaft 90 because second synchromesh gear S2 is integral with the latter.

In a second torque transfer path first epicyclic output shaft 64 is rendered integral with shaft 104 by closure of clutch C2. Meshed gears 106, 108 provide a drive connection between shaft 104 and second synchromesh shaft 110. Second synchromesh unit 112, similar to first synchromesh unit 94, includes a driven synchromesh gear 114 integral with second synchromesh shaft 110. In a similar manner to that described before, couplers (not shown) render the drive synchromesh gear 114 integral with either third synchromesh gear S3 or fourth synchromesh gear S4. By selective operation of second synchromesh unit 112, second synchromesh shaft 110 can be drivingly connected to output shaft 90 either directly (via gear S3) or indirectly (via gear S4, 116, shaft 98 and gears 100, 102).

In a third torque transfer path second epicyclic output shaft 66 is coupled to input side of third clutch C3 via a pair of gears 118 and 120. Closure of clutch C3 provides a drive path between second epicyclic output 66 and first synchromesh shaft 88. The torque transfer sub-paths (to be described below) provided by first synchromesh unit 94 complete the torque transfer path to the output shaft 90 and thus differential gear 24.

The clutches involved, that is forward clutch 30, reverse clutch 48 and first, second, third clutch C1, C2, C3 are of the wet multi-disc type and are each hydraulically actuate to allow electro-hydraulic control from an electronic control unit (not shown). However it will be understood that other types of clutches can instead be utilised.

From reading the above description it will be become apparent that the transmission 10 provides three main torque transfer paths between the engine 20 and differential gear 24. In a first torque transfer path power is conveyed via the hydrostatic power branch 16, first clutch C1 and first synchromesh unit 94, thereby providing a hydrostatic drive path including an in-line non-mechanical drive connection. In a second torque transfer path power is conveyed via the power split arrangement of the epicyclic unit 14 and power branch 16, second clutch C2 and second synchromesh unit 112. In a third torque transfer path power is transmitted via the power split arrangement 14, 16, third clutch C3 and first synchromesh unit 94.

For each of the aforementioned torque transfer paths two torque transfer sub-paths are available and selectable by the associated synchromesh units 94, 112. This provides five practical paths to transmit torque from the engine 20 to differential unit 24. It should be appreciated that a sixth path via clutches C1 and S2 is possible but not preferred.

Also provided is a four-wheel drive clutch 122, the input side of which is driven by a pair of gears 124, 126 driven by output shaft 90. It should be understood that four-wheel drive clutch 122 permits selective engagement of a four-wheel drive mode in which the front wheels of the vehicle are also provided with power for additional traction.

In the following passages the various operational modes will be described with reference to the forward direction of travel. A separate description of the reverse mode will be given thereafter.

Figure 2:
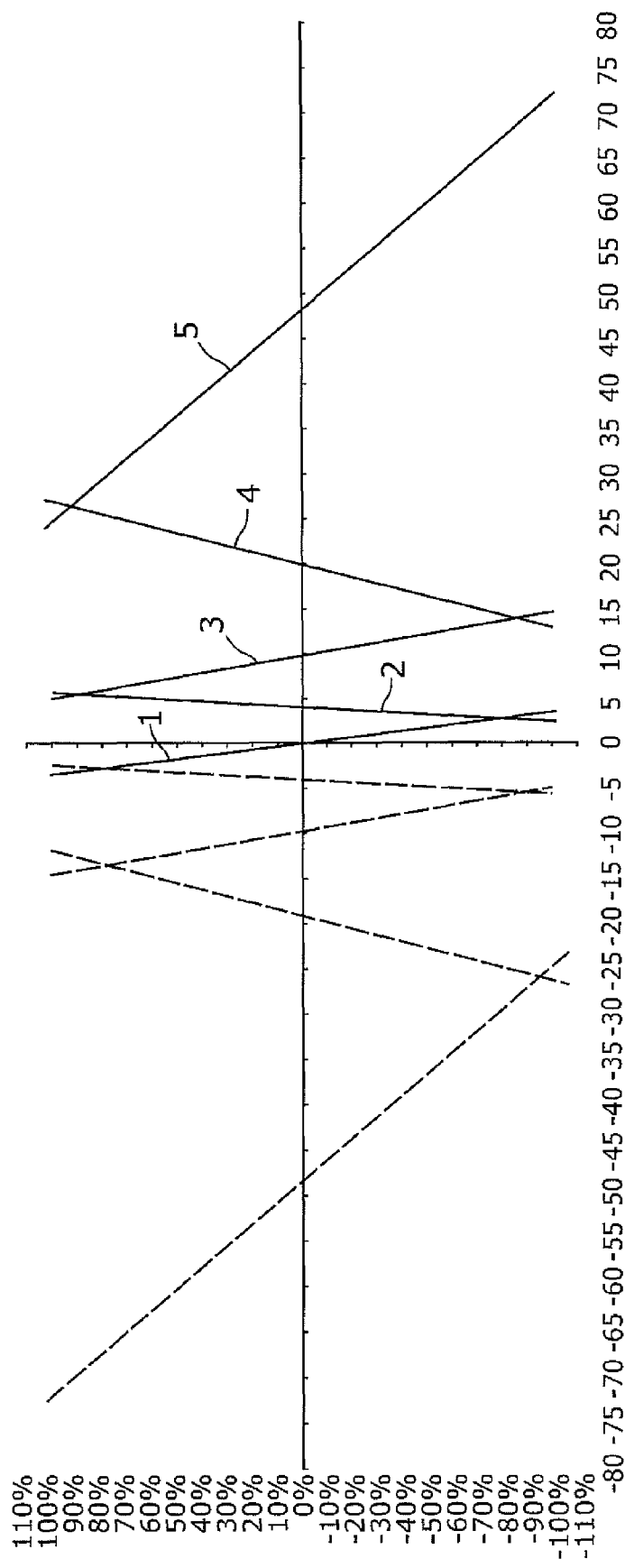
FIG. 2 shows a plot of pump angles v. drive speed (at a constant engine speed) for the various transmission stages available.

In a first transmission stage, or hydrostatic mode, neither the forward nor reverse clutches 30, 48 need be closed to deliver torque from the engine 20 to the differential gear 24. First clutch C1 is closed and first synchromesh gear S1 is engaged. The forward speed of the vehicle is controlled therefore by the engine output speed at driveshaft 22 and the variable ratio provided by hydrostatic power branch 16. Line 1 plotted on FIG. 2 shows the correlation of forward speed (horizontal axis) of the vehicle at a constant engine speed in the first transmission stage with varying angles (vertical axis) of the swashplate in the pump 68. It can be seen that this hydrostatic mode can deliver a standstill (zero speed) as is available in some infinitely variable transmissions. Assuming a steady engine speed, a decrease in the swashplate angle from 0% results in stepless change in forward speed ratio. At these low speed ratios in the hydrostatic mode maximum drawbar force is available due to the torque transfer path bypassing the mechanical gearings of the epicyclic module 14 and instead passing via the mechanical drive connection 74, 76, 82, 84, 86.

When in transmission Stage 0 or 1 (see FIG. 3), both the forward and reverse clutches 30, 48 may be open due to the permanent drive connection to the hydrostatic branch 16 via gear train 32, 34, 36. Second and third clutches C2 and C3 are open which allows the forward clutch 30 to be closed under low load in preparation for a shift to transmission Stage 2.

Line 2 on FIG. 2 is representative of transmission Stage 2 in which torque is transferred via third clutch C3 and first synchromesh gear 51. When increasing the forward speed ratio by reducing the swashplate angle (as described above in relation to the hydrostatic mode) the input and output sides of third clutch C3 become equal at a given angle which corresponds to the intersection of lines 1 and 2 in FIG. 2. At this point the transmission can change from Stage 1 to Stage 2 by simultaneously opening first clutch C1 and closing third clutch C3. Provided the input and output sides of third clutch C3 are equalised there will be no noticeable jump in transmission ratio thereby providing continuous traction and improved comfort for the driver.

In transmission Stage 2 torque is transferred from the engine 20 to the differential 24 via the power split arrangement of epicyclic module 14 and power branch 16, third clutch C3 and first synchromesh gear 51. At constant engine revs, the drive speed is further increased by increasing the swashplate angle as illustrated by line 2 in FIG. 2. During acceleration second synchromesh unit 112, under no load at this stage, engages fourth synchromesh gear S4 in anticipation of the next change in transmission stage. It should be understood that the engagement of fourth synchromesh gear S4 can be executed earlier instead.

At (or near) maximum swashplate angle in transmission Stage 2, the input side and output side of second clutch C2 become equalised in terms of rotational speed. This point is represented by the intersection of lines 2 and 3 on FIG. 2 and represents the point during acceleration at which the transmission can switch from Stage 2 to Stage 3 in a seamless manner. At this point third clutch C3 is opened at the same time as second clutch C2 is closed. Torque is then transferred from the engine 20 to the differential gear 24 via clutch C2 and fourth synchromesh gear S4.

Further acceleration is enabled by a decrease in swashplate angle from maximum to minimum as represented by line 3 in FIG. 2. During acceleration in transmission Stage 3 the first synchromesh unit 94, under no load at this stage, engages second synchromesh gear S2 in preparation of the anticipated change in transmission stage.

At (or near) minimum swashplate angle in transmission Stage 3 represented by the crossover of lines 3 and 4 in FIG. 2, the input and output sides of third clutch C3 become equalised. At this point, assuming further acceleration is required, clutch C3 is closed at the same time as clutch C2 is opened thereby switching the transfer of torque back to the first synchromesh unit 94.

An increase in transmission ratio in transmission Stage 4 is enabled by an increase in the swashplate angle from minimum to maximum as represented by line 4 in FIG. 2. During this acceleration stage second synchromesh unit 112 engages third synchromesh gear S3 in preparation in the anticipated up-shift in transmission stage.

At (or near) maximum pump angle in transmission Stage 4, the input and output sides of the second clutch C2 equalise in terms of speed. At this point, represented by the crossover of lines 4 and 5 in FIG. 2 an up-shift in transmission stage is executed by simultaneously closing second clutch C2 and opening third clutch C3. This provides the highest transmission stage (Stage 5) in which further acceleration up to the maximum available ratio is carried out by a decrease in swashplate angle as represented by line 5 in FIG. 2.

It should be understood that FIG. 2 represents the input-to-output ratio of the overall transmission 10 and the horizontal axis can only represent forward speed at a steady engine speed. In normal operation the forward speed of the vehicle will be determined by appropriate adjustment of both the transmission ratio and the engine speed, typically to optimise the efficiency.

During deceleration, or a decrease in transmission ratio, the aforementioned sequence of clutch and synchromesh changes is reversed and the skilled person will understand that the unloaded synchromesh unit can engage the appropriate gear in anticipation of the next transmission stage change (down-shift).

In summary of the basic operation of the transmission shown in FIG. 1, a power split transmission is provided in conjunction with a direct shift transmission to provide a continuous range of input-to-output speed ratios whilst also providing a purely hydrostatic mode which can be used to deliver maximum drawbar force at standstill. The DSG module 18 permits seamless changes in transmission stage so as not to interrupt the tractive force and place unnecessary loads on the transmission components as in known agricultural tractor transmission. In particular when under heavy loads such as during ploughing the transmission stage can be changed without stopping and/or interrupting the tractive force.

Disposed at the front end of the transmission arrangement shown in FIG. 1, forward-reverse module 12 permits all forward transmission ratios to also be available in reverse. The forward and reverse clutches 30, 48 are alternatively engageable (by associated hydraulic cylinders) to close the alternative torque transfer paths. In the forward range, forward clutch 30 is closed to provide a direct transmission of torque from driveshaft 22 to epicyclic input 38. In reverse mode, forward clutch 30 is opened and reverse clutch 48 is closed and torque is transferred via first gear set 32, 34, 36 and second gear set 42, 44. Due to one gear set including an odd number of gears and the second gear set comprising and even number of gears the direction of torque is reversed between driveshaft 22 and epicyclic first input 38.

Moreover, by providing a constant drive connection between the driveshaft 22 and the hydrostatic branch 16, forward and reverse drive ratios are available at low speeds when both the forward and reverse clutches 30, 48 are open. Furthermore, the placement of the forward reverse transmission module 12 upstream of the epicyclic module 14 allows the latter to be reversed for reverse gears. In other words, without the reversing of the first epicyclic input 38 the changing from hydrostatic transmission stage (Stage 1) in reverse mode to the (reverse) second transmission stage (Stage 2) would be non-trivial.

When operating in the hydrostatic mode, or first transmission stage, the forward and reverse clutches 30, 48 can be open. In these modes both forward and reverse at low drive ratio is available and can be sensed by an appropriate electronic control unit (ECU) in real time. In order to prepare for any required up-shift in transmission stage, the ECU may pre-empt such a change by selectively engaging forward clutch 30 or reverse clutch 48 depending on the sensed direction of movement, indicated by (X) in FIG. 3. For example, in a situation in which the transmission is operating in the first transmission stage in the forward direction, the ECU may command closure of the forward clutch 30 to bring the input side of third clutch C3 up to speed before the commanded up-shift.

When under low load, determined by suitable pressure sensors in the hydrostatic power branch 16, the transmission 10 may operate in a 'short-shifting mode' wherein changes in transmission stage (as described above) are executed before the speed of the input and output sides of the incoming clutch are equalised. In other words, and with reference to FIG. 2, the changes in transmission stage are commanded away from the intersection points of the lines shown.

In one example, an ECU, having determined that the transmission is under low load and a high acceleration is commanded, may execute the up-shifts in transmission stage when the swashplate angle is at +/−50%. Advantageously, this avoids the need for the swashplate to reach maximum or minimum angle in order to up-shift.

The consequence is a transmission which behaves in a similar manner to known power-shift transmissions.

It should be understood that elements of the transmission illustrated in FIG. 1 can be utilised in isolation, in combination with other transmission elements or arranged in a different order. For example, the direct shift transmission module 18 may instead be coupled to the front of another transmission module instead of direct connection to a differential gear as shown in FIG. 1. Alternatively, the power split transmission provided by the forward-reverse module 12, epicyclic module 14, and hydrostatic power branch 16 may be replaced with a known power shift transmission having its outputs coupled to the direct shift transmission module 18.

In another arrangement not illustrated, the hydrostatic power branch 16 may be replaced with an electrostatic power branch comprising an electric generator and motor. Alternatively, the power branch may be replaced by a mechanical drive connection comprising one or more clutches as know in agricultural tractors in the VALTRA power shift range.

From reading the present disclosure, other modification will be apparent to persons skilled in the art. Such modifications may involve other features which are already known in the field of transmissions and component parts therefore and which may be used instead of or in addition to features already described herein.

The invention claimed is:

1. A power-split transmission for a vehicle comprising a forward-reverse transmission module, an epicyclic module and a secondary power branch, the forward-reverse transmission module comprising an input shaft coupled to a primary motor, an output shaft, first and second clutches which are alternatively engageable to close respective forward and reverse drive paths between the input shaft and output shaft, wherein engagement of the first clutch couples the input shaft directly to the output shaft, and engagement of the second clutch couples the input shaft to the output shaft via first and second gear sets which each comprise a plurality of meshed gears, one of said gear sets comprising an odd number of gears and the other said gear set comprising an even number of gears, the epicyclic module having a first epicyclic input connected to the output shaft of the forward-reverse transmission module, a second epicyclic input connected to an output side of the secondary power branch, and an epicyclic output comprising a first output and a second output, wherein the secondary power branch derives power from the primary motor via the first gear set and the transmission further comprises a direct shift transmission module, and first, second and third main torque transfer paths between the primary motor and differential gear, each main torque transfer path including a clutch and a synchromesh unit which allows selection of one of a plurality of torque transfer sub-paths within the direct shift transmission module, the first main torque transfer path bypassing the epicyclic module and including the secondary power branch, the first and second epicyclic outputs being alternatively coupled to the differential gear via the second and third torque transfer paths respectively, wherein the first and third main torque transfer paths share a synchromesh unit.

2. A transmission module according to claim 1, wherein the first gear set consists of three meshed gears, and the second gear set consists of two meshed gears.

3. A transmission according to claim 1, wherein the forward-reverse module further comprises an auxiliary shaft, wherein the first gear set is in driving connection between the input shaft and the auxiliary shaft, and the second gear set is in driving connection between the auxiliary shaft and an input side of the second clutch.

4. A transmission according to claim 1, wherein the secondary power branch comprises a hydrostatic drive connection which includes a hydraulic pump and a hydraulic motor.

5. A transmission according to claim 1, wherein the secondary power branch comprises an electrical drive connection which includes an electrical generator and an electric motor.

6. A transmission according to claim 1, wherein the secondary power branch comprises a mechanical drive connection between the primary motor and the output side thereof.

7. An agricultural tractor comprising a transmission according to claim 1.

* * * * *